US009845061B2

(12) United States Patent
Courtin et al.

(10) Patent No.: US 9,845,061 B2
(45) Date of Patent: Dec. 19, 2017

(54) FASTENER FOR FASTENING A PANEL TO A SUPPORT AND ASSEMBLY TO FASTEN TO SAID SUPPORT, PROVIDED WITH A FASTENER AND A PANEL

(71) Applicant: ILLINOIS TOOL WORKS INC., Glenview, IL (US)

(72) Inventors: Christian Courtin, Vaureal (FR); Laurent Huet, Meru (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 55 days.

(21) Appl. No.: 14/759,981

(22) PCT Filed: Jan. 9, 2014

(86) PCT No.: PCT/US2014/010942
§ 371 (c)(1),
(2) Date: Jul. 9, 2015

(87) PCT Pub. No.: WO2014/110301
PCT Pub. Date: Jul. 17, 2014

(65) Prior Publication Data
US 2015/0353028 A1 Dec. 10, 2015

(30) Foreign Application Priority Data
Jan. 14, 2013 (FR) ..................... 13 50289

(51) Int. Cl.
*B60R 13/02* (2006.01)
*F16B 5/06* (2006.01)
*F16B 21/09* (2006.01)

(52) U.S. Cl.
CPC ........ *B60R 13/0206* (2013.01); *F16B 5/0628* (2013.01); *F16B 21/09* (2013.01);
(Continued)

(58) Field of Classification Search
CPC ...... F16B 5/0628; F16B 21/09; F16B 21/086; B60R 13/0206; Y10T 24/304; Y10T 24/309; Y10T 24/42; Y10T 24/303
See application file for complete search history.

(56) References Cited

U.S. PATENT DOCUMENTS

| 5,651,634 A | 7/1997 | Kraus | |
| 6,039,523 A * | 3/2000 | Kraus | F16B 5/0628 |
| | | | 411/48 |

(Continued)

FOREIGN PATENT DOCUMENTS

| EP | 0648944 A1 | 4/1995 |
| EP | 0726401 A1 | 8/1996 |

(Continued)

OTHER PUBLICATIONS

ISR and WO for PCT/US2014/010942 dated May 9, 2014.

*Primary Examiner* — Robert J Sandy
*Assistant Examiner* — Michael Lee
(74) *Attorney, Agent, or Firm* — Hauptman Ham, LLP (57) ABSTRACT

The invention concerns a fastener comprising a foot and a head comprising a plate to which said foot is linked, a wedge and a shank connecting said plate to said wedge, which comprises a back-plate, a rim and flexible arms connecting said rim to said back-plate, each arm comprises a first and a second curved section, and an elbow connecting them, said first section is connected to said back-plate by a first end of said arm and said second section is connected to said rim by a second end of said arm, said back-plate and each flexible arm are configured such that the distance between the center of said back-plate and said second section increases along said second section from said elbow to said rim.

22 Claims, 4 Drawing Sheets

(52) U.S. Cl.
CPC ............ *Y10T 24/303* (2015.01); *Y10T 24/304* (2015.01); *Y10T 24/309* (2015.01)

(56) References Cited

U.S. PATENT DOCUMENTS

| | | | | |
|---|---|---|---|---|
| 6,287,043 B1 * | 9/2001 | Kraus | ................... | F16B 5/0628 24/292 |
| 6,659,701 B1 | 12/2003 | Risdale | | |
| 2005/0102915 A1 | 5/2005 | Echtler | | |
| 2006/0000064 A1 | 1/2006 | Leverger et al. | | |
| 2007/0098523 A1 * | 5/2007 | Klein | ................... | B60R 13/0206 411/508 |
| 2008/0298890 A1 * | 12/2008 | Koike | ................... | F16B 5/0628 403/408.1 |
| 2013/0031752 A1 * | 2/2013 | Davies | ................. | F16B 5/0628 24/453 |
| 2014/0196259 A1 * | 7/2014 | Kuhm | ................... | B60R 13/0206 24/289 |
| 2015/0135484 A1 * | 5/2015 | Leverger | ............... | F16B 21/086 24/292 |
| 2017/0002853 A1 * | 1/2017 | Huet | ................... | B60R 13/0206 |

FOREIGN PATENT DOCUMENTS

| | | |
|---|---|---|
| FR | 2872556 A1 | 1/2006 |
| GB | 867420 A | 5/1961 |
| JP | 2002012102 A | 1/2002 |

* cited by examiner

FASTENER FOR FASTENING A PANEL TO A SUPPORT AND ASSEMBLY TO FASTEN TO SAID SUPPORT, PROVIDED WITH A FASTENER AND A PANEL

RELATED APPLICATIONS

The present application is a National Phase of International Application Number PCT/US2014/010942 filed Jan. 9, 2014 and claims priority to French Application Number 1350289 filed Jan. 14, 2013.

SUMMARY

The invention in general concerns fasteners for fixing a panel to a support such as a vehicle body panel.

Fasteners are known which have a head to be inserted in a keyhole slot of the panel and a clip foot to be inserted in an opening of predefined diameter on the support, the head and the clip foot being linked.

French patent application FR 2 872 556 already describes such a fastener, also called a clip, fitted with a clip foot and a head. The head comprises a sealing collar, a plate to which the sealing collar is attached, a wedge and a shank connecting the plate to the wedge.

The wedge comprises a back-plate formed by a rigid hub, a circular rim with a plurality of deformable arcs linked together by connecting webs, and a plurality of deformable arms linking the rim to the back-plate.

The panel has a recess which extends the keyhole slot and is wider than this slot, and in which recess the wedge is configured to move while the plate and the foot of the fastener remain outside the panel.

To position the fastener in the panel, the head is pressed into the recess until the wedge is level with the recess, then the shank is slid into the slot.

If the axis of the fastener is not fully transverse to the sliding motion, certain parts of the wedge abut against surfaces of the recess. Deformation of the wedge allows this not to block the sliding.

Once the fastener is in position in the recess, the wedge expands and the fastener is re-centered.

When a panel is attached to a support, the deformable wedge allows the foot of the fastener to be inserted in the support opening even if this is slightly offset in relation to the geometry of the slot of the panel.

The smaller back-plate is situated against one of the surfaces of the recess and prevents the pulling-out of the fastener.

The invention is intended to provide a fastener of the same type but with improved performance, while being particularly simple and easy to produce and use.

To this end, in a first aspect the invention concerns a fastener for fixing a panel to a support, comprising a clip foot configured to be pressed axially through a hole in said support, and a head comprising a plate to which said clip foot is linked, a wedge and a shank connecting said plate to said wedge, said wedge comprising a back-plate formed by a rigid hub, a rim and a plurality of flexible arms each connecting said rim to said back-plate, said wedge being configured to be inserted in a recess arranged in a thickness of said panel, and said shank being configured to be received in a keyhole slot in said panel opening into said recess; said fastener being characterized in that each said flexible arm comprises a first curved section, a second curved section and an elbow connecting said first curved section to said second curved section, said first curved section being connected to said back-plate by a first end of said flexible arm and said second curved section being connected to said rim by a second end of said flexible arm opposite the first end thereof; said back-plate and each said flexible arm being configured such that the distance between the center of said back-plate and said second curved section increases along said second curved section from said elbow to said rim.

The fastener according to the invention allows a substantial deformation of each flexible arm when the fastener is in a working configuration in which the wedge (and hence the flexible arms) is deformed. Thus the fastener according to the invention has an amplitude of movement of the rim and back-plate in relation to each other which is far higher than the above-mentioned fastener of the prior art.

In other words, the fastener according to the invention has high performance in terms of absorbing the play between itself and the panel, and is therefore particularly suitable for fixing a panel to a support even when the axis of the fastener is not transverse to the sliding of the head in the slot of the panel and/or is offset in relation to the axis of the hole in the support.

It will be noted that the back-plate is centered on the axis of the fastener such that the back-plate and the flexible arms are configured such that the distance between the center of said back-plate, passing through the axis of the fastener, and the second section increases along this second section.

It will also be noted that, more precisely, the first section of each flexible arm has a first end connecting the first section to the back-plate and a second end, opposite the first end, connecting the first section to the elbow, and the second section of each flexible arm has a first end connecting the second section to the elbow and a second end, opposite the first end, connecting the second section to the rim; with the first end of the first section corresponding to the first end of the flexible arm and with the second end of the second section corresponding to the second end of the flexible arm. Thus the back-plate and the flexible arms are configured such that the distance between the center of said back-plate, passing through the axis of the fastener, and the second section increases along this second section from its first end to its second end.

According to preferred simple, convenient and economic characteristics of the fastener according to the invention:
 said back-plate and each said flexible arm are also configured such that the distance between the center of said back-plate and said first curved section diminishes along said first curved section from said back-plate to said elbow when said flexible arm is in a rest configuration in which it is not deformed;
 said rim is peripheral and extends, in cross section, in the form of a circle with a first center, and said second curved section of each said flexible arm extends, in cross section, in the form of an arc of a circle with a second center different from said first center;
 said rim is peripheral and extends, in cross section, in the form of a circle with a first center, and said first curved section of each said flexible arm extends, in cross section, in the form of an arc of a circle with a third center different from said first center;
 said elbow of each said flexible arm has a hairpin shape and each said flexible arm is configured such that said first section extends circumferentially from said back-plate to said elbow in a first direction, and said section extends circumferentially from said elbow to said rim in a second direction opposite said first direction;
 said flexible arms succeed each other and are distributed regularly around said back-plate and each said flexible arm is configured such that its elbow is arranged radially facing said second end of said flexible arm which precedes it;

said flexible arms succeed each other and are distributed regularly around said back-plate and each said flexible arm is configured such that its elbow is arranged circumferentially facing said first end of said flexible arm which precedes it when each said flexible arm is in a rest configuration in which it is not deformed, and moves away from or nearer to said first end of said flexible arm which precedes it when each said flexible arm is in a working configuration in which it is deformed;

each said flexible arm is configured such that, in said working configuration, its elbow moves away until it comes into contact with said rim or moves nearer until it comes into contact with said back-plate; said back-plate comprises a plurality of rigid branches protruding radially from an outer face of said back-plate, with each said flexible arm which is connected by its first end to a said respective rigid branch;

said back-plate and said flexible arms are configured such that said second section of each said flexible arm is arranged at a distance from said respective rigid branch, to which each said flexible arm is connected, when each said flexible arm is in said rest configuration;

said back-plate and said flexible arms are configured such that said second section of each said flexible arm moves away from or nearer to said respective rigid branch, to which each said flexible arm is connected, when each said flexible arm is in said working configuration;

each said rigid branch has a first thickness and each said flexible arm has a second thickness smaller than said first thickness; and/or said first section of each said flexible arm has a first length, and said second section of each said flexible arm has a second length at least 1.5 times greater than said first length.

The invention also concerns in a second aspect an assembly configured to be fixed to a support, comprising a panel with at least one keyhole slot opening onto a recess arranged in the thickness of said panel, and at least one fastener.

According to preferred simple, convenient and economic characteristics of the assembly according to the invention, said plate is arranged on an outer surface of said panel.

BRIEF DESCRIPTION OF THE DRAWINGS

The invention will now be described below in the detailed description of an exemplary embodiment, given here as illustration and not limitative, with reference to the attached drawings on which.

DETAILED DESCRIPTION OF THE DRAWINGS

FIGS. 1 to 4 show a fastener 1 comprising a head 2 and a clip foot 3 made of plastic material molded as a single part.

The fastener 1 extends globally in an axial direction.

The head 2 comprises a sealing collar 7, a plate 4 to which the sealing collar 7 is linked, a wedge 5 and a shank 6 connecting the plate 4 to the wedge 5, the various elements being coaxial with each other and each having a generally circular form.

The plate 4 comprises a lower face 22 and an upper face 23 opposite the lower face 22.

The sealing collar 7 has a crown 21 surrounding the plate 4 and a frustoconical portion extending from the lower face 22 of the plate 4 to a free edge 24.

The wedge 5 comprises a back-plate 11, here formed by a rigid hub, a peripheral circular rim 10 and four flexible arms 9 connecting the hub 11 to the rim 10.

Figure 4:
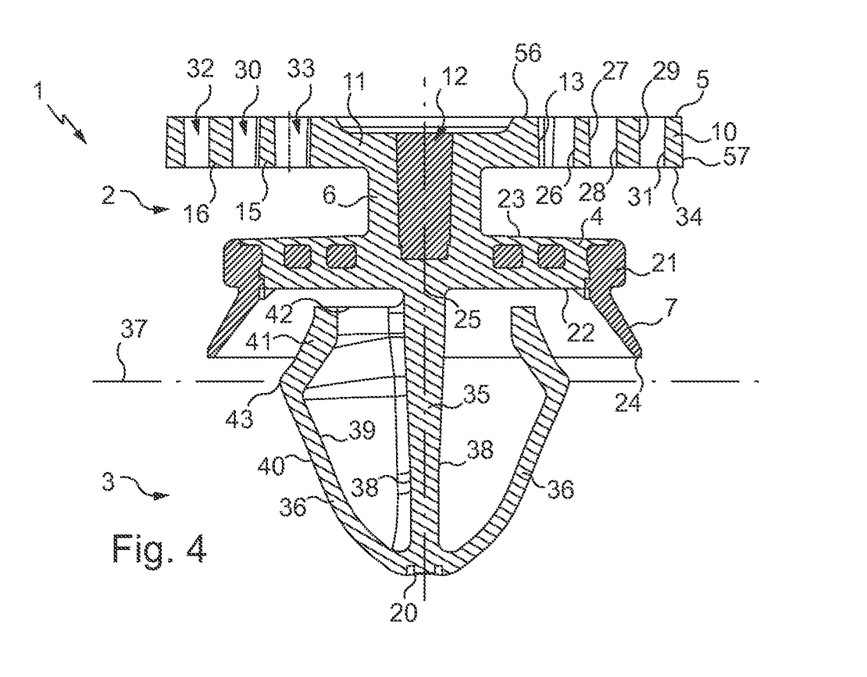
FIG. 4 is a cross section view marked IV-IV on FIG. 1.

The wedge 5 has a predefined constant height (FIG. 4).

Figure 3:
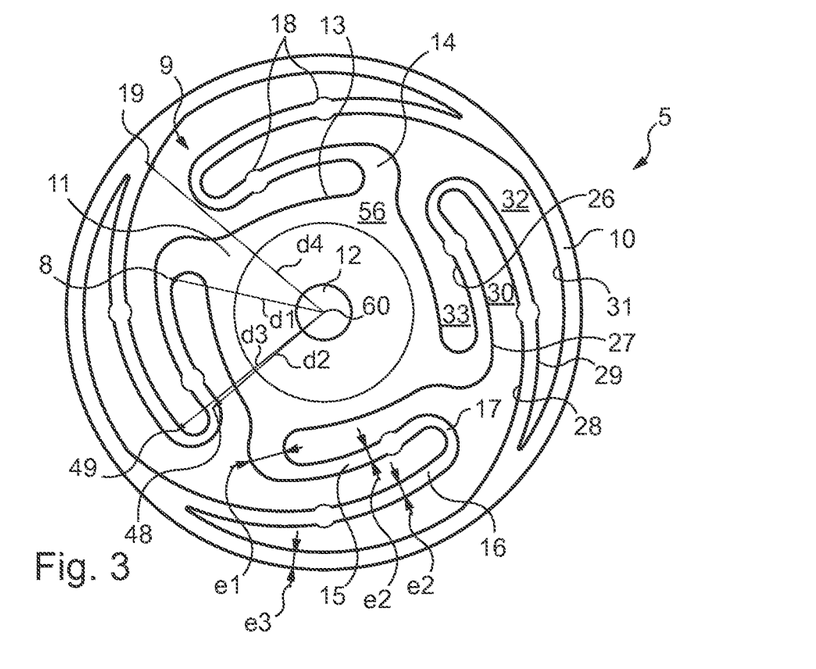
FIG. 3 is a view from above showing in isolation a wedge of the fastener in FIGS. 1 and 2.

The hub 11 here has, in cross section, a substantially square shape forming four peaks (not shown) and is centered on the axis of the fastener 1 so as to present a center 60 (FIGS. 3 and 4).

The hub 11 has an upper face 56 in which there is a central circular opening 12 arranged in the hub 11. This opening 12 is an extension of a lower hollow part of the shank 6.

The hub 11 also comprises an outer lateral face 13 and four rigid branches 14 which each protrude radially from the outer lateral face 13, substantially level with one respective peak of the four peaks.

The four rigid branches 14 have a predefined thickness e1, here lying in the range 2-4 mm, and a predefined length in the range 2-3 mm.

The four rigid branches 14 are each configured to form a support and holding zone for the hub 11 and more generally the wedge 5 (see below).

The rim 10 extends, in cross section, in the form of a circle with a first center coinciding with the center 60 of the hub 11.

The rim 10 has an inner face 31, an outer face 57 and a lower edge 34 connecting the inner face 31 to the outer face 57.

The rim 10 has a predefined thickness e3, here lying in the range 0.6-1.2 mm, and is configured to be deformable. The flexible arms 9 succeed each other and are distributed regularly around the hub 11.

It is noted that the wedge 5 has a rotational symmetry of one quarter turn. Only a single pair formed by a peak of the hub 11 and the corresponding flexible arm 9 will be described in detail.

The flexible arm 9 comprises a first curved section 15, a second curved section 16 and an elbow 17 of hairpin shape which connects the first section 15 to the second section 16.

The first section 15 has a first end 8 and a second end 48 opposite the first end 8.

The first end 8 is connected to the branch 14 at a first junction (not shown), while the second end 48 is connected to the elbow 17.

The first end 8 forms a first end of the flexible arm 9 via which it is connected to the hub 11.

The first section 15 extends circumferentially in relation to the hub 11 in a first direction.

The first section 15 extends, in cross section, in the form of an arc of a circle with a center (not shown), also called the second center, different from the center 60 of the hub 11.

The first section 15 has a concave inner face 26 arranged facing the outer lateral face 13 of the hub 11, and a convex outer face 27 opposite the inner face 26.

The inner face 26 of the first section 15 and the outer lateral face 13 of the hub 11 delimit a first space 33 arranged between the hub 11 and the flexible arm 9.

The first section 15 has a boss 18 arranged close to its second end 48.

The second section 16 has a first end 49 and a second end 19 opposite the first end 49.

The first end 49 is connected to the elbow 17 while the second end 19 is connected to the inner face 31 of the rim 10 at a second junction (not shown).

The second end 19 forms a second end of the flexible arm 9 via which it is connected to the rim 10.

The second section 16 extends circumferentially in relation to the hub 11, in a second direction opposite the first direction in which the first section 15 extends.

The second section 16 extends, in cross section, in the form of an arc of a circle with a center (not shown), also called the third center, different from the center 60 of the hub 11.

The center of the circle arc defined by the second section 16 is here similar to the center of the circle arc defined by the first section 15.

The second section 16 has a concave inner face 28 arranged facing the outer face 27 of the first section 15 and a convex outer face 29 opposite the inner face 28 and arranged facing the inner face 31 of the rim 10.

The outer face 29 of the second section 16 and the inner face 31 of the rim 10 delimit a second space 32 arranged between the flexible arm 9 and the rim 10.

The outer face 27 of the first section 15 and the inner face 28 of the second section 16 delimit a third space 30 arranged between the two sections of the flexible arm 9.

The second section 16 has a boss 18 arranged substantially in the middle of its length, also called the second length.

It is noted that each flexible arm 9 is configured such that its respective elbow 17 is arranged radially facing the second end 19 of the flexible arm 9 which precedes it.

The first section 15 has a length, also called the first length, which is shorter than the second length. Here the length of the second section 16 is at least 1.5 to 2 times greater than the length of the first section 15; while the first section 15 and the second section 16 have a globally constant, predefined thickness e2 which here lies in the range of 0.4-0.8 mm. More generally, the flexible arm 9 has a globally constant thickness.

The thickness e2 of the sections of the flexible arm 9 is significantly less than the thickness e1 of the rigid branch 14.

The first end 8 of the flexible arm 9 is at a distance d1 from the center 60 of the hub 11, the second end 48 of the first section 15 is at a distance d2 from the center 60 of the hub 11, the first end 49 of the second section 16 is at a distance d3 from the center 60 of the hub 11, and the second end 19 is at a distance d4 from the center 60 of the hub 11 (FIG. 3).

The hub 11 and the flexible arm 9 are configured such that the distance between the center 60 of the hub 11 (passing through the axis of the fastener 1) and the second curved section 16 increases along this second curved section 16 from its first end 49, connecting it to the elbow 17, to its second end 19, connecting it to the rim 10. In other words, distance d4 is greater than distance d3 and the distance increases along the second section 16 between d3 and d4.

The fastener 1 described above on FIGS. 1 to 4 is shown in a rest configuration in which neither the flexible arms 9 nor the rim 10 is deformed.

In this rest configuration, the hub 11 and the arms 9 are configured such that the distance between the center 60 of the hub 11 and the first curved section 15 diminishes along the length of the first curved section 15 from its first end 8, connecting it to the rigid branch 14 of the hub 11, to its second end 48, connecting it to the elbow 17. In other words, distance d1 is greater than distance d2 and the distance diminishes slightly along the length of the first section 15 between d1 and d2.

In this rest configuration, the hub 11 and the flexible arm 9 are also configured such that the second curved section 16 of the flexible arm 9 is arranged at a distance from the respective rigid branch 14 to which it is connected.

In this rest configuration, the flexible arm 9 is also configured such that its elbow 17 is arranged circumferentially facing the first end 8 of the flexible arm 9.

Figure 1:
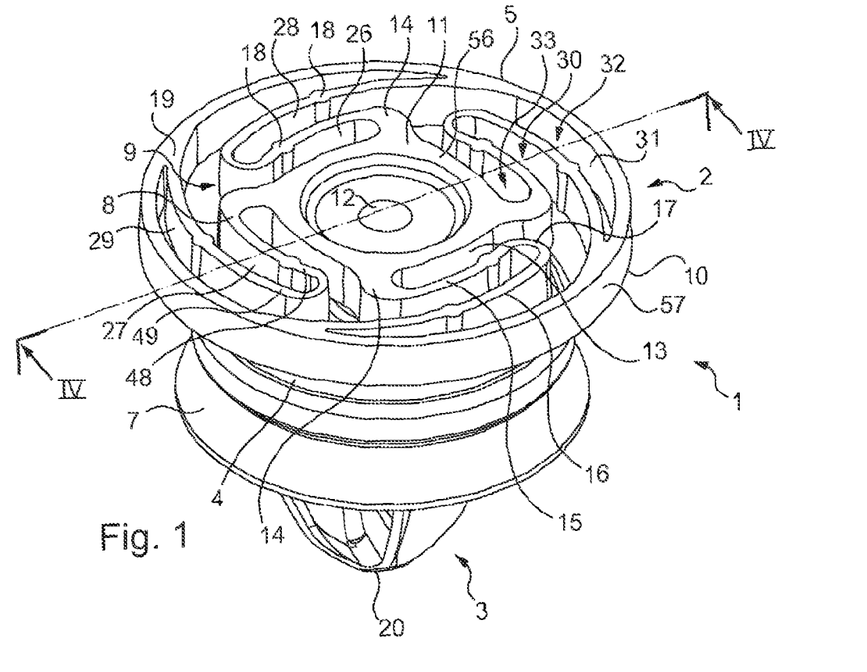
FIGS. 1 and 2 are perspective views, taken from different angles, of a fastener according to the invention.
Figure 2:
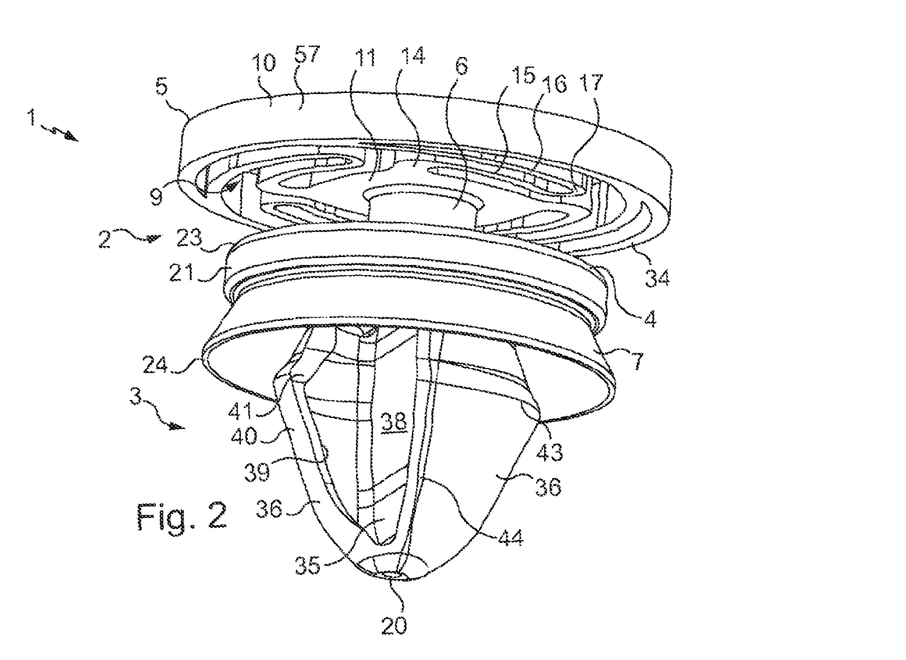

The head 2 and the clip foot 3 are connected by a junction 25 arranged on the lower face 22 of the plate 4 of the head 2.

The clip foot 3 comprises a rigid core 35 which protrudes from the lower face 22 of the plate 4 at the level of the junction 25.

The frustoconical portion of the collar 7 of the head 2 surrounds this junction 25.

The clip foot 3 extends from the junction 25 to a pointed free end 20 and the flat rigid core 35 extends in an axial direction between this junction 25 and this free end 20.

The clip foot 3 also comprises two curved wings 36, each protruding from the rigid core 35 transversely in relation to the axial direction thereof.

The core 35 has, in cross section, a substantially rectangular contour and comprises two opposing flat faces 38 and two opposing straight portions 44 (only one of which is shown here), which each connect the two flat faces 38.

Each wing 36 connects to the core 35 along a respective portion 44. Each wing 36 has an inner face 39 and an outer face 40 edged by the flat face 38, a longitudinal portion 41 and a transverse portion 42 facing the plate 4.

The inner face 39 of each wing 36 is here concave and has a profile which globally follows that of the outer face 40.

Each wing 36 has a thickness that is constant overall but with a slight reduction in this thickness towards its longitudinal portion 41. The distribution of thickness of the wings 36 allows the latter to deform elastically.

On either side of a bending plane 37 (FIG. 4) oriented transversely to the axial direction of the foot 3, the outer surface 40 of the wings 36 tapers respectively towards the free end 20 and towards the transverse portions 42 of the wings 36.

The outer face 40 of the wings 36 has, at the level of the plane 37, a ridge 43 of generally oval form.

Figure 5:
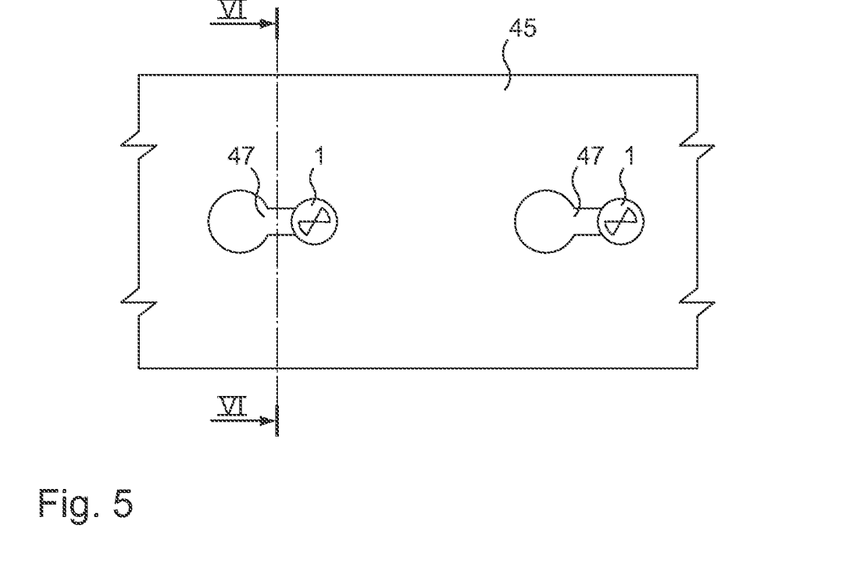
FIG. 5 is a view from above of a panel in which two fasteners according to FIGS. 1 and 2 are inserted.
Figure 6:
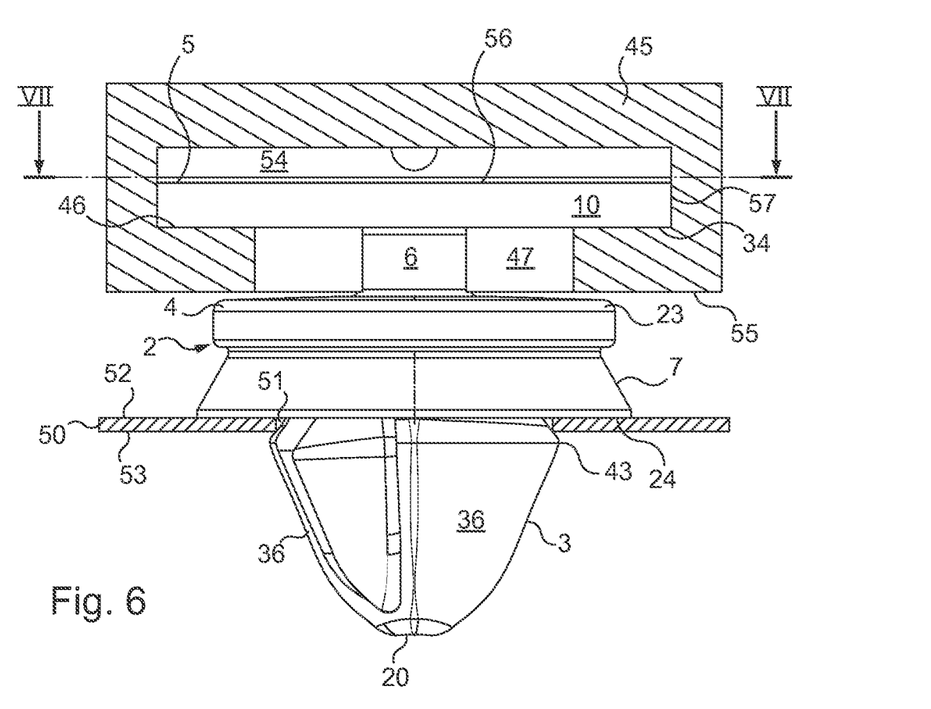
FIG. 6 is a cross section view marked VI-VI on FIG. 5, showing also a support in which a clip foot of the fastener of FIGS. 1 and 2 is inserted.
Figure 7:
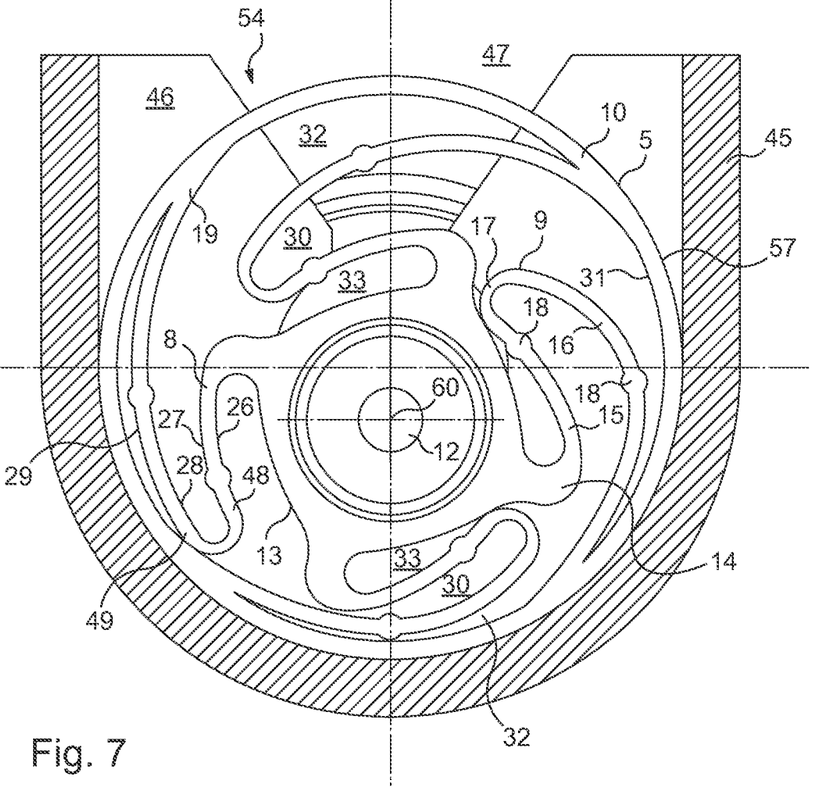
FIG. 7 is a cross section view marked VII-VII on FIG. 6.

We will now describe with reference to FIGS. 5 to 7 the fixing of the fastener 1 to a panel 45 in order to form an assembly which is fixed to a support 50.

FIG. 5 shows the panel 45 (partially shown) with two fasteners 1 which are here fixed to the latter, while the support 50 is not visible on this FIG. 5.

The panel 45 is here formed by a trim panel for a vehicle door and the support 50 is formed by a body panel for this vehicle door (FIG. 6).

The panel 45 has an outer surface 55 and a keyhole slot 47 arranged in the thickness of the panel 45.

The keyhole slot 47 has a round part of slightly larger diameter than the diameter of the wedge 5, and an elongated part with a width corresponding approximately to the diameter of the shank 6, the slot 47 having a depth equal to the height of the shank 6.

The slot 47 opens onto a recess 54 which is wider than this slot 47 and has a depth greater than the height of the wedge 5.

This recess 54 is configured to receive the wedge 5 while the plate 4 and the clip foot 3 of the fastener 1 remain outside the panel 45.

To position the fastener 1 in the panel 45, the head 2 is pressed into the recess 54 through the round part of the slot 47 until the wedge 5 is level with the recess 54, then the shank 6 is slid into the slot 47, which is then in an annular space around the shank 6 between the wedge 5 and the plate 4.

The fastener 1 slides parallel to the orientation of the elongated part of the slot 47 such that the shank 6 engages in the elongated part of the slot 47.

If the axis of the fastener 1 is not perfectly transverse to the sliding of the panel 45, certain parts of the wedge 5 will abut against surfaces of the recess 54.

However, these operations and in particular the sliding are generally carried out such that the axis of the fastener 1 is rarely transverse to the sliding.

When the axis of the fastener 1 is inclined in relation to a direction transverse to the sliding, the center 60 of the hub 11 and more generally of the wedge 5 is offset from the middle of the recess 54, and the wedge 5 does not lie flat in the recess 54 of panel 45. In such a position, the rim 10 deforms to a greater or lesser extent, depending on the incline.

When the fastener 1 requires a slight deformation, only the second section 16 of at least one flexible arm 9 flexes, independently of the first respective section 15. If the deformation is greater, the first section 15 also flexes in addition to the second section 16, such that at least one of the flexible arms 9 deforms substantially over its entire length.

The wedge 5, because of the deformation of the flexible arms 9, allows absorption of the play between this wedge 5 and the surfaces of the recess 54 of panel 45, so as not to block its sliding in the panel 45.

The fastener 1 is then in a working configuration in which the flexible arms 9 are deformed (FIGS. 6 and 7).

In this working configuration, each flexible arm 9 is configured such that its elbow 17 moves away from or nearer to the first end 8 of the flexible arm 9 which precedes it.

More precisely, certain flexible arms 9 are configured such that their respective elbow 17 moves away in the direction of, or even comes into contact with, the inner face 31 of the rim 10 whereas certain other flexible arms 9 are configured such that their respective elbow 17 moves towards, or even comes into contact with, the outer lateral face 13 of the hub 11.

In this working configuration, the hub 11 and the flexible arms 9 are also configured such that the second section 16 of each flexible arm 9 moves away from or nearer to the respective rigid branch 14 to which each flexible arm 9 is connected.

More precisely, certain flexible arms 9 are configured such that their respective second section 16 moves away from the respective rigid branch 14 whereas certain other flexible arms 9 are configured such that their respective second section 16 moves nearer to or even comes into contact with the respective rigid branch 14.

Once the sliding is complete, the wedge 5 expands and the fastener 1 is re-centered, the fastener 1 then moves from its working configuration to its rest configuration.

In fact the fastener 1 is re-centered since the flexible arms 9, and more precisely each of the portions of the latter, return to their rest configuration where they are not deformed and in which the axis of the fastener 1 is transverse to the panel 45.

The fastener 1 is held in the recess 54 by the rim 10, the dimensions of which allow this fastener 1 to be blocked.

The dimensions of the wedge 5 are adapted to those of the recess 54, which prevents noise-producing vibrations and a risk of the panel 45 separating from the support 50 (see below). Despite the production tolerances of the panel 45 and the fastener 1, and the geometry of the recess 54, this adaptation is possible thanks to the presence of the deformable rim 10 and the flexible arms 9 of the wedge 5.

The wedge 5 inserted in the panel 45 rests, by the lower edge 34 of the rim 10, on a contact face 46 of the recess 54, and the outer face 57 of the rim 10 comes to press against the surfaces of the recess 54.

It will be noted that the rigid branches 14 are each configured to form a support and holding zone for the hub 11 and more generally the wedge 5, both during the sliding of the fastener 1 in the slot 47 and in the recess 54 of the panel 45 (fastener 1 in working configuration) and after the wedge 5 has been inserted in the panel 45 (fastener 1 in rest configuration). These rigid branches 14 are configured to come to press on the contact face 46 of the recess 54.

If the axis of the fastener 1 is not perfectly transverse to the orientation of the slot 47 of the panel 45, these rigid branches 14 hold the wedge 5 in the recess 54 of this panel 45 and so hold the fastener 1 together with the panel 45.

The wedge 5 is thus housed in the recess 54 and the shank 6 is situated in the slot 47, while the plate 4, collar 7 and foot 3 remain outside the panel 45, such that the upper face 23 of the plate 4 faces the outer face 55 of the panel 45.

The fastener 1 and the panel 45 thus form an assembly ready to be mounted on a support 50.

The support 50 (FIG. 6) to which the fastener 1 is to be fixed has an opening 51 of circular contour with a diameter smaller than the maximum radial extension of the clip foot 3 (this maximum extension lies in the plane 37).

The support 50 also has an upper face 52 and a lower face 53 opposite the upper face 52.

When the head 2 is positioned in the panel 45, the clip foot 3 is pressed into the orifice 51, the pointed end 20 of the clip foot 3 first, and the cooperation between the periphery of the opening 51 and the part of the wings 36 situated between the end 20 and the plane 37 has the effect of causing the wings 36 to flex progressively until this part of the foot has passed through the opening 51.

The wings 36 then expand, which has the effect of driving the clip foot 3 in the direction of pressing until it abuts against the lower face 53 of the support 50, on the side via which the clip foot 3 has been pressed in.

The sealing collar 7 is then applied against the upper face 52 of the support 50.

In the case where the opening 51 of the support 50 is not perfectly aligned with the slot 47, the latter must be inclined so it can be inserted in the opening 51. The wedge 5 is then no longer flat in the recess 54, the second section 16 of at least one flexible arm 9 and where applicable its first section 15 are flexed to allow the positioning of the fastener 1 in the panel 45 and the support 50. This can occur in particular when the panel 45 and the support 50 are fixed using several fasteners 1.

Due to the fineness of the sealing collar 7, the stop which finishes the pressed insertion movement of the clip foot 3 is present on the panel 45 rather than on the fastener 1.

The four peaks of the hub 11, and more precisely the four rigid branches 14, ensure a resistance against separation of the panel 45 from the support 50 at four points.

If a traction is applied in the separation direction, the four corners come to press on the contact face 46 of the panel 45 in the recess 54, such that the wedge 5 cannot deform at the level of the hub 11 in this direction parallel to the axis of the fastener 1.

It therefore cannot be driven through the elongated part of the slot 47 if too great a traction is exerted on the fastener 1.

The rigid branches 14 compensate for the fact that the flexible arms 9 of the wedge 5 allow a particularly high amplitude of movement of the rim 10 and hub 11 in relation to each other. In fact the flexible arms 9 do not or scarcely accentuate the separation resistance.

It will be noted that the rigid branches 14 thus form support zones in the manner of skis.

It will also be noted that FIG. 7 clearly shows the offset between the axis of the fastener 1 (the center 60 of the hub 11) and the axis of the hole in the support.

The wedge 5 therefore combines the function of blocking separation and the function of useful deformation, in particular on positioning of the fastener 1 in the panel 45 and in the support 50.

To detach the panel 45 from the support 50, a traction force is applied to the panel 45.

The fastener 1 is not extracted thanks to the peak and in particular the protruding rigid branches 14 of the hub 11. In this movement, the fastener 1 can be subjected to a force in the direction parallel to the axis of the fastener 1. Generally it is subject to successive forces in different directions, such that the wedge 5 deforms, without breaking, because of the forces, in the same way as described above.

The clip foot 3 then has less resistance to extraction and leaves the opening 51 of the support 50, in a movement which is the reverse of that previously described.

Then, if necessary, the fastener 1 can be removed from the panel 45 by sliding the fastener 1 in the elongated part of the keyhole slot 47.

In variants not shown:
the wedge comprises more or fewer flexible arms, for example 3 or 5;
the wedge comprises more or fewer rigid branches, for example 3 or 5, depending on the number of flexible arms;
the hub of the wedge has, in cross section, a circular or rectangular form rather than square;
the first section and the second section of each flexible arm extend, in cross-section, in the form of a circle arc, with the circle arc of the first section having a different center from the circle arc of the second section;
the panel has keyhole slots provided with a notch transverse to the elongated part, in which notch the fastener is trapped;
the assembly comprises a panel with a plastic block fixed in a recess of corresponding dimension, and the block has a keyhole slot configured to receive the fastener;
the clip foot of the fastener has for example 3 or 4 wings rather than 2;
the clip foot of the fastener has wings different from those described above; and/or
the fastener is not made of one molded piece but of two separate pieces which are connected together.

More generally, it is recalled that the invention is not limited to the examples described and illustrated.

The invention claimed is:

1. A fastener for fixing a panel to a support, comprising a clip foot configured to be pressed axially through a hole in said support, and a head comprising a plate to which said clip foot is linked, a wedge and a shank connecting said plate to said wedge, said wedge comprising a back-plate formed by a rigid hub, a rim and a plurality of flexible arms each connecting said rim to said back-plate, said wedge being configured to be inserted in a recess arranged in a thickness of said panel, and said shank being configured to be received in a keyhole slot in said panel opening into said recess; said fastener being characterized in that each said flexible arm comprises a first curved section, a second curved section and an elbow connecting said first curved section to said second curved section, said first curved section being connected to said back-plate by a first end of said flexible arm and said second curved section being connected to said rim by a second end of said flexible arm opposite the first end thereof; said back-plate and each said flexible arm being configured such that the distance between the center of said back-plate and said second curved section increases along said second curved section from said elbow to said rim, wherein at least one of:
(i) said back-plate and each said flexible arm are also configured such that the distance between the center of said back-plate and said first curved section diminishes along said first curved section from said back-plate to said elbow when said flexible arm is in a rest configuration in which it is not deformed;
(ii) said first section of each said flexible arm has a first length, and said second section of each said flexible arm has a second length at least 1.5 times greater than said first length;
(iii) the first curved sections curve inward towards the back-plate for at least substantially all of their lengths;
(iv) the first curved sections curve inward towards the back-plate along the distance from the back-plate to the respective elbows;
(v) respective locations of the first curved sections where the first curved sections meet the respective elbows is closer to the back-plate than the respective locations of the first curved sections furthest away from the respective elbows;
(vi) each of the flexible arms are such that the arms reverse a direction of extension by around 180 degrees between the first section and the second section; or
(vii) said back-plate comprises a plurality of rigid branches protruding radially from an outer face of said back-plate, with each said flexible arm which is connected by its first end to a said respective rigid branch and each said rigid branch has a first thickness and each said flexible arm has a second thickness smaller than said first thickness.

2. The fastener as claimed in claim 1, wherein said back-plate and each said flexible arm are also configured such that the distance between the center of said back-plate and said first curved section diminishes along said first curved section from said back-plate to said elbow when said flexible arm is in the rest configuration in which it is not deformed.

3. The fastener as claimed in claim 1, wherein said rim is peripheral and extends, in cross section, in the form of a circle with a first center, and said second curved section of each said flexible arm extends, in cross section, in the form of an arc of a circle with a second center different from said first center.

4. The fastener as claimed in claim 1, wherein said rim is peripheral and extends, in cross section, in the form of a circle with a first center, and said first curved section of each said flexible arm extends, in cross section, in the form of an arc of a circle with a third center different from said first center.

5. The fastener as claimed in claim 1, wherein said elbow of each said flexible arm has a hairpin shape and each said flexible arm is configured such that said first section extends circumferentially from said back-plate to said elbow in a first direction, and said second section extends circumferentially from said elbow to said rim in a second direction opposite said first direction.

6. The fastener as claimed in claim 1, wherein said flexible arms succeed each other and are distributed regularly around said back-plate and each said flexible arm is configured such that its elbow is arranged radially facing said second end of said flexible arm which precedes it.

7. The fastener as claimed in claim 1, wherein said flexible arms succeed each other and are distributed regularly around said back-plate and each said flexible arm is configured such that its elbow is arranged circumferentially facing said first end of said flexible which precedes it when each said flexible is in a rest configuration in which it is not deformed, and moves away from or nearer to said first end of said flexible arm which precedes it when each said flexible arm is in a working configuration in which it is deformed.

8. The fastener as claimed in claim 7, wherein each said flexible arm is configured such that, in said working configuration, its elbow moves away until it comes into contact with said rim or moves nearer until it comes into contact with said back-plate.

9. The fastener as claimed in claim 1, wherein said back-plate comprises a plurality of rigid branches protruding radially from an outer face of said back-plate, with each said flexible arm which is connected by its first end to a said respective rigid branch.

10. The fastener as claimed in claim 8, wherein said back-plate and said flexible arms are configured such that said second section of each said flexible arm is arranged at a distance from said respective rigid branch, to which each said flexible arm is connected, when each said flexible arm is in said rest configuration.

11. The fastener as claimed in claim 8, wherein said back-plate and said flexible arms are configured such that said second section of each said flexible arm moves away from or nearer to said respective rigid branch, to which each said flexible arm is connected, when each said flexible arm is in said working configuration.

12. The fastener as claimed in claim 9, wherein each said rigid branch has a first thickness and each said flexible arm has a second thickness smaller than said first thickness.

13. The fastener as claimed in claim 1, wherein said first section of each said flexible arm has the first length, and said second section of each said flexible arm has the second length at least 1.5 times greater than said first length.

14. An assembly configured to be fixed to a support, comprising a panel with at least one keyhole slot opening onto a recess arranged in the thickness of said panel, and at least one fastener as claimed in claim 1.

15. The assembly as claimed in claim 14, wherein said plate is arranged on an outer surface of said panel.

16. The fastener as claimed in claim 1, wherein said first section of each said flexible arm has a first length, and said second section of each said flexible arm has a second length greater than said first length.

17. The fastener as claimed in claim 1, wherein the entirety of the respective flexible arms is curved.

18. The fastener as claimed in claim 1, wherein the first curved sections curve inward towards the back-plate along the distance from the back-plate to the respective elbows.

19. The fastener as claimed in claim 1, wherein respective locations of the first curved sections where the first curved sections meet the respective elbows is closer to the back-plate than the respective locations of the first curved sections furthest away from the respective elbows.

20. The fastener as claimed in claim 1, wherein each of the flexible arms are such that the arms reverse the direction of extension by around 180 degrees between the first section and the second section.

21. The fastener as claimed in claim 1, wherein each of the elbows comprises the U shaped section.

22. The fastener as claimed in claim 1, wherein the first curved sections curve inward towards the back-plate for at least substantially all of their lengths.

* * * * *